United States Patent Office

Re. 27,927
Reissued Feb. 19, 1974

27,927

FOAMABLE THERMOPLASTIC POLYMER GRANULES AND METHOD FOR MAKING

Werner L. Jablonski, Midland, Mich., by Dow Chemical Co., Midland, Mich., assignee No Drawing. Original No. 3,663,466, dated May 16, 1972, Ser. No. 749,287, Aug. 1, 1968. Application for reissue Mar. 8, 1973, Ser. No. 339,714

Int. Cl. C08f *33/02, 47/10*

U.S. Cl. 260—2.5 B 8 Claims

Matter enclosed in heavy brackets [ ] appears in the original patent but forms no part of this reissue specification; matter printed in italics indicates the additions made by reissue.

ABSTRACT OF THE DISCLOSURE

Foamable styrene polymers are prepared by incorporating within the particles an alkali metal salt of long chain or aromatic carboxylic acids. Improved fusion, low cooling time and anti-clumping properties are obtained.

This invention relates to improved foamable thermoplastic granules and a method of making such granules, and more specifically is concerned with improved alkenyl aromatic resinous granules containing a volatile raising agent.

Expandable synthetic resinous granules, and particularly those of styrene polymers and polystyrene, have found wide commercial acceptance for the molding of various shaped articles. Shuch expandable particles or granules are generally prepared in the form of small beads; the beads are then heated, frequently by means of hot air or steam, to cause partial foaming and provide what is frequently referred to as pre-expanded beads. The pre-expanded beads are usually placed within a closed mold and heated by means of a heat exchange fluid which most frequently is steam to cause further expansion of the beads and to cause the partially expanded particles to knit together to form a unitary body. Although many compositions can be prepared in the form of expandable beads, certain characteristics are necessary to prepare a commercially acceptable product. One particularly undesirable feature of some expandable styrene polymer particles is that on prefoaming, the particles tend to clump together to form aggregates and are not in desirably free-flowing condition, thus presenting problems in handling of the particles or beads in the pre-foaming equipment and difficulty in transferring the beads to the mold. Various surface additives have been empolyed to overcome the clumping tendency. It is also highly desirable that such particles, on molding, fuse together into a strong unitary body. One critical characteristic of expandable beads for commercial acceptability is a characteristic frequently referred to as "cooling time." Cooling time usually refers to the period of time between the time when steam or other heat exchange fluid is no longer fed to the mold and the time when the mold may be opened and a dimensionally stable product or article removed therefrom. If a molded article is removed from the mold prematurely; that is, before the article has cooled sufficiently, expansion will occur and a product with undesired dimensions and form is obtained. It is highly desirable that foamable thermoplastic polymer granules exhibit the characteristic of a short cooling time.

It would be desirable if there were available an improved foamable thermoplastic resinous composition which exhibited a low clumping tendency and a method of preparing such a composition.

It would also be desirable if there were available an improved method for the preparation of foamable synthetic resinous particles having a short cooling time and exhibiting good fusion characteristics on molding.

These benefits and other advantages in accordance with the method of the present invention are achieved by providing a heat plastified alkenyl aromatic resin, adding to the heat plastified alkenyl aromatic resin from 25 to 1000 parts per million, and beneficially from about 100 to 400 parts per million, based on the weight of the heat plastified resin, of an alkali metal salt of [a long chain organic acid having from 12 to 24 carbon atoms therein, or] an alkali metal salt of the formula

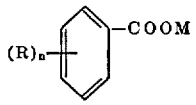

wherein R is hydrogen or an alkyl radical containing up to 5 carbon atoms, n is 0 to 1 or 2 and M is an alkali metal, or mixtures thereof, to thereby provide a resinous composition, subdividing the resinous composition to provide a plurality of granules, subsequently impregnating the granules with a volatile fluid foaming agent.

Also contemplated within the scope of the present invention is a mass of expandable alkenyl aromatic resinous particles containing a fluid foaming agent, the particles on heating being capable of expanding and forming a plurality of closed, gas-filled cells, the improvement which comprises an organic acid salt generally uniformly dispersed within the particles, the organic acid salt being [a long chain organic acid having from 12 to 24 carbon atoms therein or] an alkali metal salt of the formula

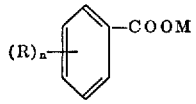

where R is hydrogen or an alkyl radical containing up to 5 carbon atoms, n is 0 to 1 or 2 and M is an alkali metal, or mixtures thereof.

By the term "alkenyl aromatic resin" is meant a solid polymer of one or more polymerizable alkenyl aromatic compounds. The polymer or copolymer comprises, in chemically combined form, at least 70 percent by weight of at least one alkenyl aromatic compound having the general formula

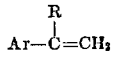

wherein Ar represents an aromatic hydrocarbon radical, or an aromatic halohydrocarbon radical of the benzene series, and R is hydrogen or the methyl radical. Examples of such alkenyl aromatics resins are the solid homopolymers of styrene, α-methylstyrene, o-methylstyrene, m-methylstyrene, p-methylstyrene, ar-ethylstyrene, ar-vinylxylene, ar-chlorostyrene or ar-bromostyrene; the solid copolymers of two or more of such alkenyl aromatic compounds with minor amounts of other readily polymerizable olefinic compounds such as methyl methacrylate or acrylonitrile, etc.

The present invention is employed with particular advantage with polystyrene. The organic acids employed in the practice of the present invention beneficially are long chain fatty acids and include long chain fatty acids of from 12 to 24 carbon atoms and include the alkali metal salts of long chain fatty acids of from 12 to 24 carbon atoms, including the lithium, sodium and potassium salts of lauric acid, tridecylic acid, myristic acid, pentadecylic acid, palmitic acid, margaric acid, stearic acid, oleic acid, nonadecylic acid, arachidic acid, behenic acid, lignoceric acid, as well as the alkali metal salts of such aromatic acids as benzoic acid, toluic acid, xylenic acid, 4-tertiarybutyl benzoic acid, 4-tertiaryamyl benzoic acid, 2-ethylbenzoic acid and mixtures thereof.

It is essential and critical to the composition of the present invention that the organic acid salts be uniformly dispersed within the composition; that is, be present in each individual particl and not merely deposited on the surface thereof. Such a composition beneficially is prepared by admixing the organic acid salt with heat plastified alkenyl aromatic resin either in the presence of fluid foaming agent or by subsequently adding a fluid foaming agent thereto. Beneficially, such mixing is advantageously done by passing a stream of heat plastified material through a malaxating device such as a screw extruder and adding the desired acid salt. The desired fluid foaming agent may be added in such a device or beneficially, if particularly close process control is desired, the alkenyl aromatic resinous material containing the organic acid is beneficially extruded and formed into strands and cut into pellets. The pellets are transferred to a pressurized reactor and the pellets suspended in water in the presence of blowing agent and heated for a period of time sufficient for the blowing agent to permeate the pellets. Advantageously, such heating is accomplished at temperatures from about 90° to 150° C. under pressure and generally spherical particles are obtained. Such procedures are well known in the art and are set forth in U.S. Letters Patents 2,950,261 and 3,086,885. Foamable particles beneficially are prepared by incorporating a minor proportion sufficient to cause foaming of a wide variety of volatile organic compounds such as petroleum ether, pentane, neo-pentane, hexane, heptane and similar hydrocarbon components and halogenated carbon components, dichlorodifluoromethane, dichlorotetrafluoroethane, trifluorochloromethane and the like. Many such fluid foaming agents are known in the art.

By way of further illustration, various samples are prepared by admixing 200 parts per million (based on the weight of the resin) of an alkali metal salt of an organic acid with molten polystyrene by preparing a concentrate of the organic acid salt by dry blending 2 percent by weight of the organic acid salt with granular polystyrene. The concentrate is fed to a screw extruder which discharges into a larger screw extruder which is fed by a stream of heat plastified polystyrene. The discharge of the smaller extruder is uniformly admixed with the polystyrene in the larger extruder. The discharge of the larger extruded is discharged from a die as a plurality of strands having a diameter of about 0.068 inch. The strands are subsequently cooled and chopped to form a plurality of granules having a length of about 0.1 inch. The granules are subsequently suspended in water in a closed, agitated reactor wherein 100 parts by weight of polymer granules are employed to 130 parts by weight of water. The slurry is heated with agitation to a temperature of about 145° C. and 9 parts by weight of pentane are added over a period of about three hours. The vessel and contents are subsequently cooled to about 20° C., and the particles separated from the water. The foamable particles are evaluated by prefoaming to a density of about 1.5 pounds per cubic foot. The foamable particles are evaluated for clumping. Clumping is reported as "percent clump" which refers to the percentage of the total number of particles in the sample which occur as agglomerates. The volatile content of the expandable beads is evaluated by weighing a sample of expandable beads heated at atmospheric pressure for 30 minutes at 160° C. and reweighing to determine the weight loss. Various samples of expandable particles or beads are then molded in a closed mold under constant conditions utilizing steam heat. In the wall of the cavity of the mold is disposed a pressure sensitive diaphragm connected to a pressure gauge. The time in minutes required for the pressure gauge to indicate zero after molding is set forth in the following table under the heading $T_{Cm}$. The mold is opened after various periods and the part removed and examined visually for dimensional stability. Time required after the steam to the mold is shut off for the molded part to become dimensionally stable is set forth in the table in the column headed $T_{Cg}$. Time is expressed in minutes. The cooling times shown in the table represent the range of cooling times over the molding range of the expandable beads being evaluated. Generally satisfactory fusion is obtained using steam and mold cavity pressures of from about 15 to about 17 pounds per square inch to about 28 to 30 pounds per square inch. The molding range is the range wherein 70 to 75 percent bead to bead fusion is obtained and below the pressure at which shrinkage visible to the unaided eye is obtained. Density of the molded part is determined and is set forth in pounds per cubic foot in the table. Cell size is determined by visual observation and classed as fine, very fine and medium.

TABLE I

| Run Number | Additive (200 p.p.m.) | Percent volatile | Percent clump | $T_{Cg}$ | Density $T_{Cm}$ | $T_{Cm}$ | Cell size |
|---|---|---|---|---|---|---|---|
| 1 | Sodium stearate | 8.7 | 0 | 2.0-2.3 | 1.2 | 0.8 | Very fine. |
| 2 | do | 7.2 | 1.6 | 2.0-2.5 | 1.3 | 1.0 | Do. |
| 3 | Sodium benzoate | 9.0 | 0 | 1.5-1.8 | 1.3 | 0.6 | Do. |
| 4 | do | 7.0 | 0.5 | 1.3-1.5 | | | Do. |
| 5 | do | 9.2 | 0.5 | 1.3-1.5 | 1.3 | 0.6 | Do. |
| 6 | Potassium stearate | 6.5 | 0.5 | 1.8-2.0 | 1.2 | 0.8 | Do. |
| 7 | Lithium stearate | 6.2 | 0 | 2.0-2.3 | 1.2 | 0.8-1.0 | Do. |
| 8 | Potassium oleate | 6.8 | 0.5 | 1.8-2.0 | 1.1 | 0.8 | Do. |
| 9 | Sodium palmitate | 7.0 | 0.5 | 1.8-2.0 | 1.3 | 0.8-1.0 | Do. |
| 10 | Sodium laurate | 7.1 | <0.5 | 1.8 | 1.3 | 0.8-1.0 | Do. |
| 11 | Sodium lignocerate | 6.7 | <0.5 | 2.0-2.3 | 1.1 | 0.8 | Do. |
| 12 | Potassium toluate | 7.7 | 0.5 | 1.5-1.8 | 1.3 | 0.6-0.8 | Do. |
| 13 | Calcium stearate | 6.5 | 0 | 2.3-2.8 | 1.1 | 1.0-1.3 | Fine. |
| 14 | do | 6.2 | 0 | 2.3-2.8 | 1.1 | 1.0-1.3 | Do. |
| 15 | None | 6.3 | 3.9 | 2.8-3.3 | 1.3 | 1.4 | Medium. |
| 16 | do | 6.1 | 3.0 | 2.8-3.3 | 1.3 | 1.4 | Do. |

NOTE.—At a density of 1.5 lbs./cu. ft.

In a manner similar to the foregoing experiments, other alkali metal salts hereinbefore set forth provide benefical improvements in cooling time and clump when employed in accordance with the present invention with the hereinbefore set forth alkenyl aromatic resins and fluid foaming agents. Particularly advantageous and beneficial are sodium stearate and sodium benzoate.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A mass of expandable alkenyl aromatic resinous particles containing a fluid foaming agent, the particles, on heating, being capable of expanding and forming a plurality of closed, gas-filled cells, the improvement which comprises an organic acid salt generally uniformly dispersed within the particles, the organic salt being [an alkali metal salt of a long chain organic acid having from 12 to 24 carbon atoms or] an alkali metal salt of the formula

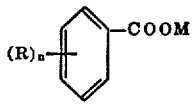

where R is an alkyl radical containing up to 5 carbon atoms, n is 0, 1 or 2, M is an alkali metal or mixtures thereof, the organic acid salt being present in a concentration of from about 25 to 1000 parts per million, based on the weight of the resin in the particle.

[2. The mass of claim 1 wherein the organic salt is sodium stearate.]

3. The mass of claim 1 wherein the organic acid salt is sodium benzoate.

4. The mass of claim 2 wherein the fluid foaming agent is pentane.

5. The mass of claim 1 wherein the alkenyl aromatic resin is polystyrene.

6. In a method for the preparation of expandable alkenyl aromatic resinous particles, the steps of the method comprising providing a heat plastified alkenyl aromatic resin, adding to the heat plastified alkenyl aromatic resin from 25 to 1000 parts per million, based on the weight of the heat plastified resin, of [an alkali metal salt of a long chain organic acid having from 12 to 24 carbon atoms therein, or] an alkali metal salt of the formula

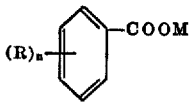

where R is hydrogen or an alkyl radical containing up to 5 carbon atoms, n is 0, 1 or 2 and M is an alkali metal or mixtures thereof, to thereby provide a resinous composition, subdividing the resinous composition to provide a plurality of granules, and subsequently impregnating the granules with a volatile fluid foaming agent.

[7. The method of claim 6 wherein the organic acid salt is sodium stearate.]

8. The method of claim 6 wherein the organic acid salt is sodium benzoate.

9. The method of claim 6 wherein the organic acid salt is present in a concentration of from about 100 to 400 parts per million, based on the weight of the resin.

10. The method of claim 6 wherein the granules are dispersed in water prior to impregnation with the volatile fluid foaming agent.

References Cited

The following references, cited by the Examiner, are of record in the patented file of this patent or the original patent.

UNITED STATES PATENTS

| | | | |
|---|---|---|---|
| 3,026,272 | 3/1962 | Rubens et al. | 260—2.5 B |
| 3,069,367 | 12/1962 | Beaulien et al. | 260—2.5 B |
| 3,385,804 | 5/1968 | Hill | 260—2.5 B |

FOREIGN PATENTS

| | | | |
|---|---|---|---|
| 210,893 | 10/1957 | Australia | 260—2.5 B |
| 1,354,156 | 1/1964 | France | 260—2.5 B |

WILBERT J. BRIGGS, Sr., Primary Examiner

U.S. Cl. X.R.

260—2.5 HB, 23 S, 33.6 UA, 94.9 GD